US012756058B2

(12) United States Patent
Kim et al.

(10) Patent No.: US 12,756,058 B2
(45) Date of Patent: Oct. 6, 2026

(54) CYLINDRICAL SECONDARY BATTERY WITH CAP ASSEMBLY CONFIGURED FOR DEFORMATION DURING GAS DISCHARGE

(71) Applicant: Samsung SDI Co., Ltd., Yongin-si (KR)

(72) Inventors: Dae Kyu Kim, Yongin-si (KR); Bo Ram Lee, Yongin-si (KR); Byung Jo Kang, Yongin-si (KR); Hyun Woo Lee, Yongin-si (KR); Seung Hyun Chung, Yongin-si (KR); Shin Jung Kim, Yongin-si (KR); Sang Hyo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 603 days.

(21) Appl. No.: 18/249,033

(22) PCT Filed: Sep. 28, 2021

(86) PCT No.: PCT/KR2021/013264

§ 371 (c)(1),
(2) Date: Apr. 13, 2023

(87) PCT Pub. No.: WO2022/080708

PCT Pub. Date: Apr. 21, 2022

(65) Prior Publication Data

US 2024/0021951 A1 Jan. 18, 2024

(30) Foreign Application Priority Data

Oct. 16, 2020 (KR) ........................ 10-2020-0134161

(51) Int. Cl.
*H01M 50/342* (2021.01)
*H01M 50/107* (2021.01)
(Continued)

(52) U.S. Cl.
CPC ..... *H01M 50/3425* (2021.01); *H01M 50/107* (2021.01); *H01M 50/152* (2021.01);
(Continued)

(58) Field of Classification Search
CPC ........... H01M 50/152; H01M 50/3425; H01M 50/147; H01M 50/107; H01M 2220/20;
(Continued)

(56) References Cited

U.S. PATENT DOCUMENTS

2011/0117407 A1 5/2011 Huang
2017/0301899 A1* 10/2017 Lee ..................... H01M 50/171
(Continued)

FOREIGN PATENT DOCUMENTS

CN 111587497 A 8/2020
JP 2007-42527 A 2/2007
(Continued)

OTHER PUBLICATIONS

Machine translation of Min et al. KR-20190012799-A (Year: 2019).*
(Continued)

*Primary Examiner* — Basia A Ridley
*Assistant Examiner* — Julia Marie Fehr
(74) *Attorney, Agent, or Firm* — Womble Bond Dickinson (US) LLP

(57) ABSTRACT

A cylindrical secondary battery is disclosed comprising: a cylindrical can having one opened end to form an opening; an electrode assembly accommodated in the cylindrical can; and a cap assembly including a vent plate which is disposed on the outermost side in the direction away from the opening and which has at least one notch, a cap down which is spaced apart from the vent plate in the direction of the opening and which is electrically connected to the electrode assembly, a support plate between the vent plate and the cap down so as to be coupled to the vent plate, and an insulating member
(Continued)

inserted between the support plate and the cap down to insulate the support plate and the cap down from each other. When the gas inside the can is discharged toward the opening, the vent plate is ruptured to be separated from the cap assembly.

10 Claims, 6 Drawing Sheets

(51) Int. Cl.

| | |
|---|---|
| ***H01M 50/152*** | (2021.01) |
| ***H01M 50/179*** | (2021.01) |
| ***H01M 50/186*** | (2021.01) |
| ***H01M 50/471*** | (2021.01) |

(52) U.S. Cl.

CPC ........ *H01M 50/186* (2021.01); *H01M 50/179* (2021.01); *H01M 50/471* (2021.01); *H01M 2200/20* (2013.01)

(58) Field of Classification Search

CPC ............. H01M 50/179; H01M 50/186; H01M 50/271; H01M 2200/20; H01M 50/172; H01M 50/342

See application file for complete search history.

(56) References Cited

U.S. PATENT DOCUMENTS

| | | | | |
|---|---|---|---|---|
| 2019/0386270 | A1 | 12/2019 | Lee et al. | |
| 2020/0358047 | A1 | 11/2020 | Kim | |
| 2020/0358048 | A1 | 11/2020 | Kim et al. | |
| 2020/0365856 | A1 | 11/2020 | Kim et al. | |
| 2021/0184321 | A1 * | 6/2021 | Kim .................... | H01M 50/152 |

FOREIGN PATENT DOCUMENTS

| | | | | | |
|---|---|---|---|---|---|
| KR | 10-2013-0033716 | A | | 4/2013 | |
| KR | 10-2016-0121106 | A | | 10/2016 | |
| KR | 10-2017-0012138 | A | | 2/2017 | |
| KR | 10-2018-0075797 | A | | 7/2018 | |
| KR | 10-1877601 | B1 | | 8/2018 | |
| KR | 10-2018-0127938 | A | | 11/2018 | |
| KR | 10-2019-0012799 | A | | 2/2019 | |
| KR | 20190012799 | A | * | 2/2019 | ........ H01M 10/0525 |
| KR | 10-2019-0040698 | A | | 4/2019 | |
| KR | 10-2019-0104688 | A | | 9/2019 | |
| KR | 10-2020-0069375 | A | | 6/2020 | |
| KR | 10-2020-0116336 | A | | 10/2020 | |
| WO | WO 2019/117368 | A1 | | 6/2019 | |
| WO | WO-2019117339 | A1 | * | 6/2019 | .......... H01M 50/593 |
| WO | WO 2021/187770 | A1 | | 9/2021 | |

OTHER PUBLICATIONS

Li, W.; Crompton, K.R.; Hacker, C.; Ostanek, J.K. Comparison of Current Interrupt Device and Vent Design for 18650 Format Lithium-ion Battery Caps, Journal of Energy Storage 32, article 101890, p. 1-10, pub. Sep. 26, 2020. (Year: 2020).*

International Search Report of PCT/KR2021/013264, Jan. 12, 2022, 4 pp.

Chinese Office Action corresponding to CN Application No. 202180070034.6, dated Aug. 29, 2025 (7 pages).

Korean Office Action dated Jul. 18, 2025, issued in Korean Patent Application No. 10-2020-0134161, 8 pages.

EPO Extended European Search Report dated Oct. 17, 2024, issued in corresponding European Patent Application No. 21880356.7, 9 pages.

Notice of Allowance dated Apr. 23, 2026 issued in corresponding Korean Patent Application No. 10-2020-0134161, 7 pages.

* cited by examiner

CYLINDRICAL SECONDARY BATTERY WITH CAP ASSEMBLY CONFIGURED FOR DEFORMATION DURING GAS DISCHARGE

CROSS-REFERENCE TO RELATED APPLICATIONS

This application is a U.S. National Phase Patent Application of International Application Number PCT/KR2021/013264, filed on Sep. 28, 2021, which claims priority to Korean Patent Application Number 10-2020-0134161, filed on Oct. 16, 2020, the entire content of each of which is incorporated herein by reference.

TECHNICAL FIELD

An embodiment of the present invention relates to a cylindrical secondary battery capable of maximizing a gas discharge effect while maintaining operational stability.

BACKGROUND ART

In general, a cylindrical secondary battery includes a cylindrical electrode assembly, a cylindrical can accommodating the electrode assembly and electrolyte, and a cap assembly coupled to an upper opening of the can to seal the can and to allow current generated from the electrode assembly to flow to an external device.

The cap assembly may include a vent plate that is ruptured to release internal gas when the gas pressure inside the secondary battery rises above a set value. The vent plate is disposed inside a cap up of the cap assembly. During the rupture of the vent plate, the cap up is fixed on the top of the can and the vent plate is covered by the cap up. Accordingly, when the remaining gas is discharged after the rupture, a gas outlet may be blocked or narrowed due to the ruptured vent plate.

The above information disclosed in this Background section is only for enhancement of understanding of the background of the invention and therefore it may contain information that does not constitute prior art.

DESCRIPTION OF EMBODIMENTS

Technical Problem

An object of the present invention is to provide a cylindrical secondary battery having a cap assembly that is deformed to maximize gas discharge during discharging of gas while maintaining operational stability by fixing parts of the cap assembly during operation and rupture.

Solution to Problem

A cylindrical secondary battery according to an embodiment of the present invention may include: a cylindrical can having one opened end to form an opening; an electrode assembly accommodated in the cylindrical can; and a cap assembly including a vent plate which is disposed on the outermost side in the direction away from the opening and which has at least one notch, a cap down which is disposed to be spaced apart from the vent plate in the direction of the opening and which is electrically connected to the electrode assembly, a support plate which is disposed between the vent plate and the cap down so as to be coupled to the vent plate, and an insulating member which is inserted between the support plate and the cap down to insulate the support plate and the cap down from each other, wherein, when the gas inside the can is discharged toward the opening, the vent plate is ruptured to be separated from the cap assembly.

A central portion of the cap down may protrude toward the vent plate to form a connection part coupled to the vent plate, and when the vent plate is operated, the connection part is separated from the cap down.

The connection part may have a welding part welded to the vent plate, and a notch may be formed to be spaced apart from the welding part in an outward direction.

The support plate is shaped of a circular plate and may have a plurality of slits spaced from an outer edge in an inward direction and formed through along a circumferential direction and a circular through hole formed through to be spaced from the slits in an inward direction, and a plurality of second supports having an arc shape may be formed between the slits ad the through hole.

The vent plate may be shaped of a circular plate and may include a bending art formed by folding an outer edge thereof, and the outer edge of the support plate may be a first support part inserted into the bending part.

The insulating member may be shaped of a ring and may be disposed between the second support and the cap down.

Notches may be formed in a circumferential direction in regions between the plurality of slits connecting the first support part and a plurality of second support parts, respectively.

The notch of the vent plate is formed adjacent to the bending part, and the notch of the support plate is formed to be spaced apart from the notch of the vent plate in an inward direction.

When the gas is discharged, the support plate may be reversed toward the vent plate, and the vent plate may be separated from the cap assembly.

When the gas is discharged, the cap down may be separated from the cap assembly when the vent plate is separated from the cap assembly.

The support plate and the insulating member may be shaped of a ring having a through hole formed in the center, and the insulating member may be disposed in the direction of the inner circumferential surface of the support plate to insulate the vent plate and the cap down from each other.

The insulating member may have an outer edge coupled to the inner edge of the support plate in an overlapping state.

Advantageous Effects of Invention

In an embodiment of the present invention, during the operation of a cylindrical secondary battery, a cap up having a notch formed therein is maintained at a state of being fixed to a can, and when gas is discharged, the cap up is ruptured and part of the cap down is ruptured together. In addition, when gas is discharged, as a support plate is deformed, the cap down is also deformed and ruptured to expand the gas discharge passage, and thus, the gas discharge rate and amount can be greatly increased, thereby maximizing a gas discharge effect.

BEST MODE

Figure 1:
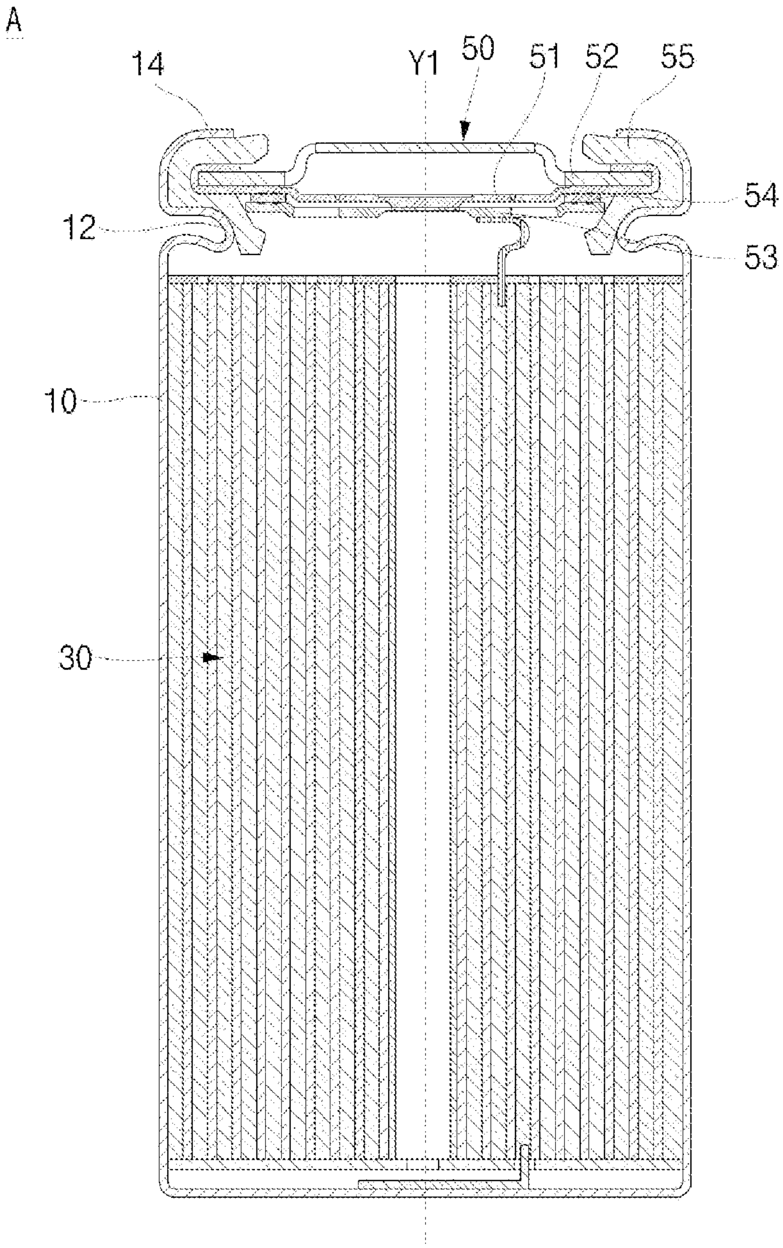
FIG. 1 is a longitudinal cross-sectional view illustrating a general cylindrical secondary battery.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity, and like numbers refer to like elements throughout. As used herein, the term “and/or” includes any and all combinations of one or more of the associated listed items. In addition, it will be understood that when an element A is referred to as being “connected to” an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms that the terms “comprise or include” and/or “comprising or including,” when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as “beneath,” “below,” “lower,” “above,” “upper,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as “below” or “beneath” other elements or features would then be oriented “on” or “above” the other elements or features. Thus, the exemplary term “below” can encompass both an orientation of above and below.

Hereinafter, a cylindrical secondary battery according to an embodiment of the present invention will be described in detail with reference to the accompanying drawings.

Figure 2:
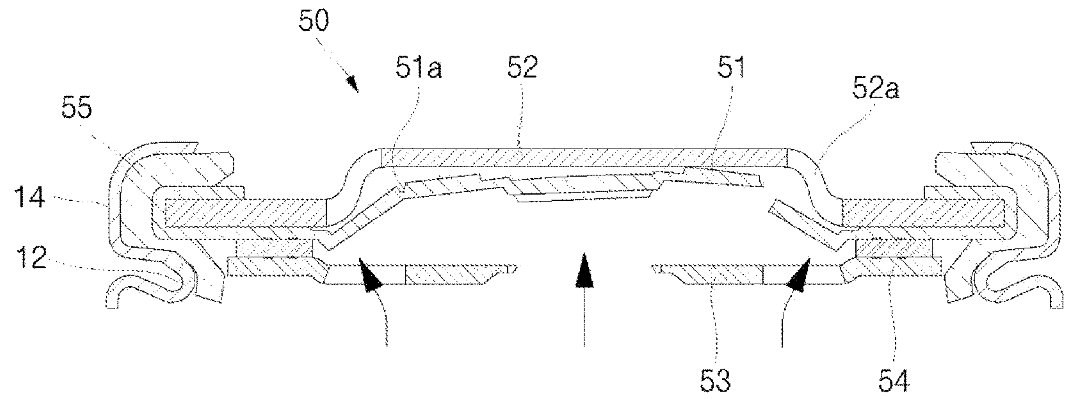
FIG. 2 is a cross-sectional view showing a state of the cap assembly when gas is discharged in the cap assembly according to FIG. 1.

FIG. 1 is a longitudinal cross-sectional view illustrating a general cylindrical secondary battery. FIG. 2 is a cross-sectional view showing a state of the cap assembly when gas is discharged in the cap assembly according to FIG. 1.

As shown in FIGS. 1 and 2, a general cylindrical secondary battery A includes a cylindrical can 10 having an opening formed at one end in the longitudinal direction, an electrode assembly 30 accommodated inside the can, and a cap assembly 50 inserted into the opening. The cap assembly 50 includes a safety vent 51, a cap up 52 disposed above the safety vent 51, and a cap down 53 disposed below the safety vent 51. The cap assembly 50 may further include an insulating member 54 inserted between the safety vent 51 and the cap down 53 to insulate parts other than the centre of the safety vent 51 from coming into contact with the cap down 53, and an insulating gasket 55 that insulates the cap assembly 50 and the can 10 from each other. In the safety vent 51, a part near the longitudinal central axis Y1 of the can 10 is in contact with the cap down 53, and a part supported by the insulating member 54 is spaced apart from the cap down 53. A notch **51*a* is formed in the safety vent 51. On one open side of the can 10, the lower portion of the cap assembly 50 is recessed inward in a ring shape to form a beading part 12, and the upper portion of the cap assembly 50 is bent inward to form a crimping part 14**.

When the pressure inside the secondary battery A rises above a certain pressure level, the safety vent 51 is deformed and the notch **51*a* is ruptured so that the gas inside the secondary battery A is discharged. The gas passes through the ruptured safety vent 51 and is discharged to the outside of the secondary battery A through a through hole 52*a* formed in the cap up 52**.

However, as shown in FIG. 2, even if the safety vent 51 is ruptured, the safety vent 51 itself still exists between the cap up 52 and the cap down 53, and the cap up 52 also exists in its original position, and thus the safety vent 51 may block a passage through which gas is discharged. In this case, a problem arises in that the gas inside the secondary battery A cannot be quickly discharged. In order to solve this problem, the present invention proposes a new cap assembly structure.

Figure 3:
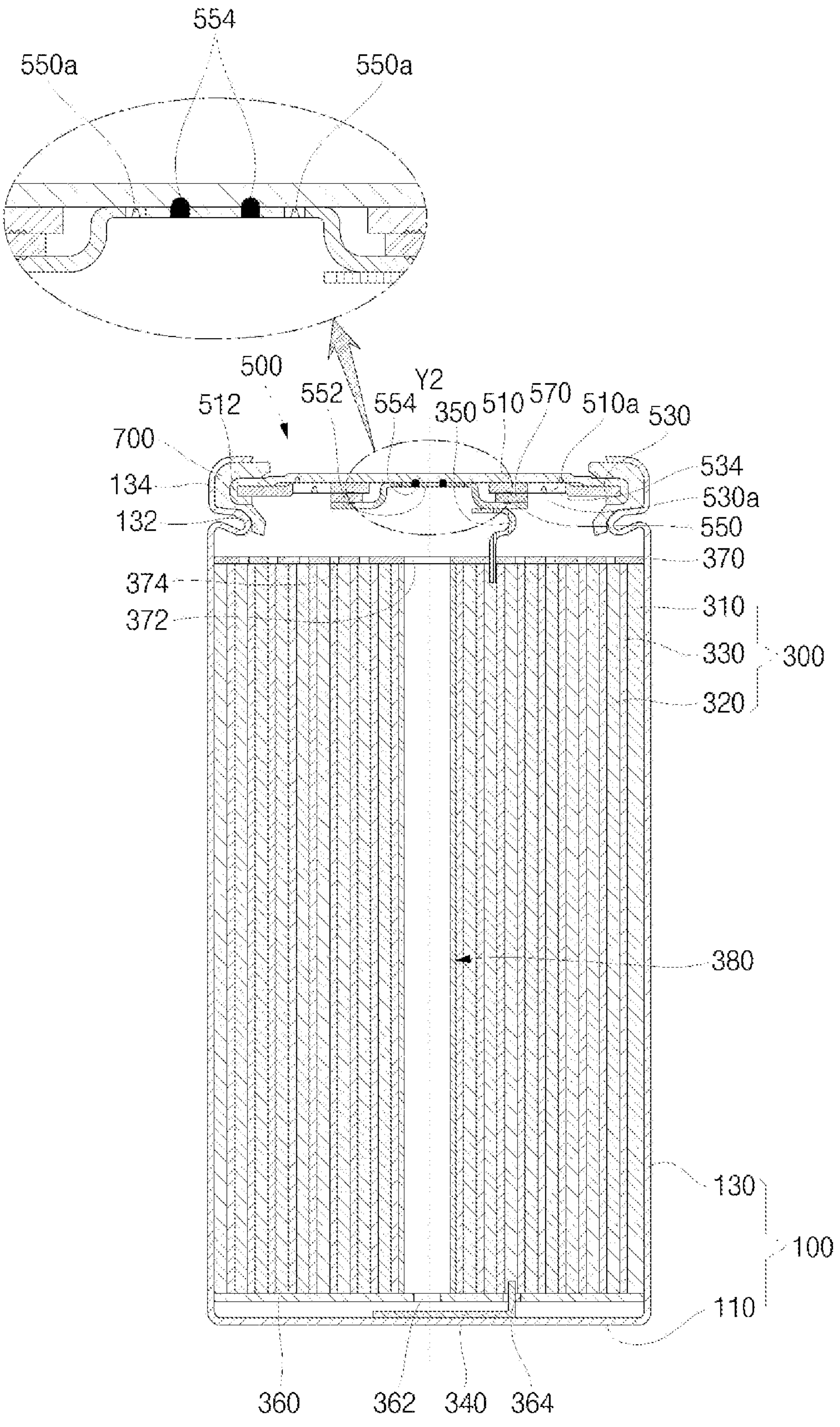
FIG. 3 is a longitudinal cross-sectional view showing a cylindrical secondary battery according to a first embodiment of the present invention.
Figure 4:
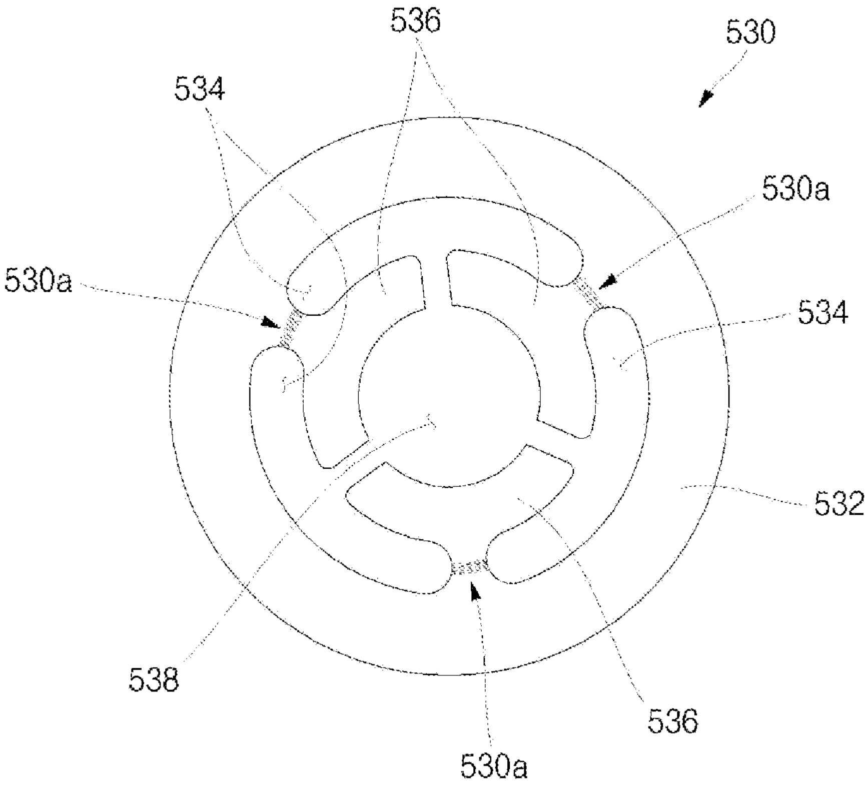
FIG. 4 is a plan view illustrating a support plate of the cap assembly according to FIG. 3.

FIG. 3 is a longitudinal cross-sectional view showing a cylindrical secondary battery according to a first embodiment of the present invention. FIG. 4 is a plan view illustrating a support plate of the cap assembly according to FIG. 3.

As shown in FIGS. 3 and 4, the cylindrical secondary battery B according to the first embodiment of the present invention may include a cylindrical can 100, an electrode assembly 300 inserted into the can 100, a cap assembly 500 inserted into one end of the can 100, and an insulating gasket 700 inserted between the can 100 and the cap assembly 500. A center pin 380 may be coupled to the electrode assembly 300.

The can 100 includes a circular bottom portion 110 and a side portion 130 extending upward from the bottom portion 110, and an upper portion of the side portion 130 is open (hereinafter referred to as an opening). In the manufacturing process of the secondary battery B, the electrode assembly 300 is inserted into the can 100 together with an electrolyte through the opening of the can 100. The can 100 may be made of steel, a steel alloy, nickel-plated steel, a nickel-plated steel alloy, aluminum, an aluminum alloy, or an equivalent thereof, but the material is not limited thereto.

The cap assembly 500 is inserted into the opening of the can 100 (which will be described later). The beading part 132 and the crimping part 134 may be formed on the side portion 130 to prevent the inserted cap assembly 500 from escaping to the outside through the opening of the can 100.

The beading part 132 is formed below the cap assembly 500, and is recessed toward the inside of the can 100. The crimping part 134 is formed above the cap assembly 500, and is shaped to be bent toward the inside of the can 100. Since the beading part 132 and the crimping part 134 hold the cap assembly 500 in the vertical direction, the cap assembly 500 may not be separated from the can 100. The electrode assembly 300 is disposed below the cap assembly 500 inside the can 100.

The electrode assembly 300 includes a negative electrode plate 310 coated with a negative electrode active material (e.g., graphite, carbon, etc.), a positive electrode plate 320 coated with a positive electrode active material (e.g., a transition metal oxide (LiCoO2, LiNiO2, LiMn2O4, etc.)), and a separator 330 disposed between the negative electrode plate 310 and the positive electrode plate 320 to prevent a short circuit and to allow only the movement of lithium ions. The negative electrode plate 310, the positive electrode plate 320, and the separator 330 may be wound in a substantially cylindrical shape and accommodated inside the can 100.

The negative electrode plate 310 may be copper (Cu) or nickel (Ni) foil, the positive electrode plate 320 may be aluminum (Al) foil, the separator 330 may be polyethylene (PE) or polypropylene (PP), but the above materials are not limited in the present invention. A negative electrode tab 340 protruding and extending a certain length downward may be welded to the negative electrode plate 310, and a positive electrode tab 350 protruding upward a certain length may be welded to the positive electrode plate 320, but the reverse is also possible. The negative electrode tab 340 may be made of copper or nickel, and the positive electrode tab 350 may be made of aluminum, but the above materials are not limited in the present invention. The negative electrode tab 340 may be welded to the bottom portion 110 of the can 100, and in this case, the can 100 may operate as a negative electrode. Conversely, the positive electrode tab 350 may be welded to the bottom 111 of the can 100, and in this case, the can 100 may operate as a positive electrode.

In addition, a first insulating plate 360 and a second insulating plate 370 may be interposed above and below the electrode assembly 300. The first insulating plate 360 prevents the positive electrode plate 320 from electrically contacting the bottom portion 110 of the can 100, and the second insulating plate 370 prevents the negative electrode plate 310 from electrically contacting the cap assembly 500.

In order to allow gas to move upward when a large amount of gas is generated due to an abnormality of secondary battery, the first insulating plate 360 includes a first hole 362 communicating with the center pin 380 and a second hole 364 through which the negative electrode tab 340 can penetrate. The negative electrode tab 340 may be welded to the bottom portion 110 through the second hole 364.

The second insulating plate 370 includes a first hole 372 through which gas can move to the cap assembly 500 when a large amount of gas is generated due to an abnormality of the secondary battery, and a second hole 374 formed therethrough to allow the positive electrode tab 350 to penetrate. The positive electrode tab 350 may be welded to a cap down 550 to be described later through the second hole 374. A plurality of second holes 374 may be formed to serve as an inlet through which electrolyte is injected into the electrode assembly 300 in an electrolyte injection process.

The center pin 380 is shaped of a hollow circular pipe and may be coupled to the center of the electrode assembly 300. The center pin 380 may be made of steel, a steel alloy, nickel-plated steel, a nickel-plated steel alloy, aluminum, an aluminum alloy, or polybutylene terephthalate, but the material is not limited thereto herein. The center pin 380 serves to suppress deformation of the electrode assembly 300 during charging and discharging of the secondary battery and serves as a passage for gas generated inside the secondary battery. In some cases, the center pin 380 may be omitted.

Meanwhile, as shown in FIG. 3, the cap assembly 500 may include a vent plate 510 exposed to the outside of the can 100, a cap down 550 disposed below the vent plate 510, a support plate 530 disposed between the vent plate 510 and the cap down 550, and an insulating member 570 disposed between the support plate 530 and the cap down 550. In FIG. 3, on the basis of an imaginary central axis Y2 along the longitudinal direction of the can 100, a direction toward the central axis Y2 is defined as an inward direction, and a direction away from the central axis Y2 is defined as an outward direction. In addition, on the basis of FIG. 3, the upper side is defined as the upper direction and the lower side as the lower direction.

As shown in FIG. 3, the vent plate 510 is disposed at the uppermost part of the cap assembly 500 (at the uppermost part on the basis of FIG. 3 and FIG. 5 to be described later). More specifically, the vent plate 510 is disposed at the outermost part that is farthest from the opening of the can 100 in the cap assembly 500. The vent plate 510 functions as a safety vent and may replace the function of a cap up in the cap assembly 500 where the cap up is omitted. The vent plate 510 may be made of the same or similar material as the cap down 550 to be described later. In addition, for a smooth rupture operation of the vent plate 510, the material of the vent plate 510 may have less rigidity than the material of the cap down 550.

The vent plate 510 is shaped of a substantially circular plate, and an outer edge thereof is folded toward the opening of the can 100 to form a bending part 512. The bending part 512 is shaped to surround the outer edge of the support plate 530 to be described later. Referring to FIG. 3, the bending part 512 is shaped to be bent downward.

In addition, the vent plate 510 has a notch 510*a* formed along the circumferential direction between the bending part 512 and the imaginary central axis Y2. The notch 510*a* may be formed in a ring shape along the circumferential direction, or a plurality of fan shapes may be arranged at regular intervals. The notch 510*a* is a portion that is ruptured when gas is discharged, and may be formed on a plate surface of the vent plate 510 facing the opening of the can 100. As such, the vent plate 510 of the present invention does not have a structure corresponding to the through hole 52*a* formed in the existing cap up 52.

In addition, the vent plate 510 may have a step so that the bending part 512 is disposed below other parts of the plate surface, on the basis of FIG. 3. The inward plate surface may be formed higher than the edge plate surface on the side of the bending part 512, approximately on the basis of the notch 510*a*. That is, the vent plate 510 has a convex shape in the upward direction, on the basis of FIG. 3.

As shown in FIGS. 3 and 4, the support plate 530 is formed by processing a substantially circular plate material. In the support plate 530, a plurality of slits 534 penetrates a portion spaced from an outer edge of the circular plate shape in an inward direction toward the central axis Y2. The slits 534 have an arc shape, and a plurality of slits 534 are arranged to be spaced apart at regular intervals. A substantially circular through hole 538 penetrates a portion spaced from the slits 534 in an inward direction.

The outer edge of the support plate 530 has a predetermined width (width in a radial direction) and is defined as a first support part 532. A part or all of the first support part 532 is covered by the bending part 512 of the vent plate 510. A region between the slits 534 and the through hole 538 is defined as a second support part 536. Since the slits 534 have an arc shape and the through holes 538 are circular, the second support part 536 has a plurality of arc shapes. The first support part 532 and the second support part 536 are connected to the region between the slits 534. A notch 530*a* is formed between the slits 534 connecting the first support part 532 and the second support part 536, respectively. The notch 530*a* is formed more inward than the notch 510*a* of the vent plate 510. When gas is discharged, the second support part 536 is deformed in an upward direction, on the basis of the notch 530*a*, and is inverted, thereby quickly discharging gas. However, the support plate 530 may maintain a deformed state without being separated from the cap assembly. The support plate 530 may be made of the same or similar material as the insulating member 570. Alternatively, the cap down 550 may be made of the same or similar material.

In addition, the first support part 532 and second support part 536 have a step with respect to each other. On the basis of FIG. 3 (and FIG. 5 to be described later), the upper surface of the second support part 536 is located higher than the upper surface of the first support part 532. That is, on the basis of FIG. 3, the support plate 530 is convex in an upward direction. This structure corresponds to the stepped structure of the vent plate 510.

Therefore, on the basis of FIG. 3, the first support part 532 is in a state in which a portion of the lower surface facing the opening of the can 100 is wrapped by the bending part 512, and most of the upper surface is in contact with the lower surface of the vent plate 510. The second support part 536 is in a state in which the entire upper surface thereof is in contact with the lower surface of the vent plate 510. The second support part 536 is located inward from the notch 510*a* of the vent plate 510. In this state, the cap down 550 is disposed with the insulating member 570 interposed therebetween.

As shown in FIG. 3, the cap down 550 is shaped of a substantially circular plate and is disposed below the vent plate 510. In the cap down 550, the central portion of the disc protrudes upward in a substantially cylindrical shape and is in close contact with the lower surface of the vent plate 510. Conversely, the cap down 550 has a shape in which an edge is bent downward from a central portion. A portion in close contact with the vent plate 510 is defined as a connection part 552. The edge of the circular plate of the cap down 550 is disposed on the lower surface of the second support part 536 of the support plate 530 with the insulating member 570 therebetween. In this state, the connection part 552 and the vent plate 510 are welded and fixed. Only the welding part 554 to be welded is connected to the vent plate 510, and other parts are not in contact with the vent plate 510. A notch 550*a* may be formed along a radial direction on the connection part 552 spaced apart from the welding part 554 in an outward direction. When gas is discharged, a portion of the notch 550*a* on the connection part 552 is ruptured.

The insulating member 570 allows the support plate 530 and the cap down 550 to be maintained at a separation state, and serves to insulate the support plate 530 and the cap down 550 from each other. Accordingly, the insulating member 570 may be formed in the shape of a circular ring having a predetermined width when viewed from the top. For example, the insulating member 570 is made of polyethylene (PE), polypropylene (PP), ethylene propylene diene monomer (M-class) rubber (EPDM rubber), or an equivalent thereof, but is not limited thereto. The insulating member 570 may be welded to the support plate 530 and the cap down 550 by ultrasonic welding or laser welding.

As described above, when the vent plate 510, support plate 530, cap down 550, and insulating member 570 are combined to form the cap assembly 500, the bending part 512 of the vent plate 510 covers the first support part 532 of the support plate 530. Accordingly, the lower surface of the second support part 536 of the support plate 530 and the vent plate 510 come into contact with each other. Here, the support plate 530 and the cap down 550 are coupled with the insulating member 570 therebetween. In addition, the connection part 552 of the cap down 550 is welded to the lower surface of the vent plate 510. This state is defined as the assembly state of cap assembly 500.

In the cylindrical secondary battery having the above-described configuration, states of various components of the cap assembly according to the gas discharge process will now be described (components not shown in the drawings will be described with reference to FIG. 3).

Figure 5:
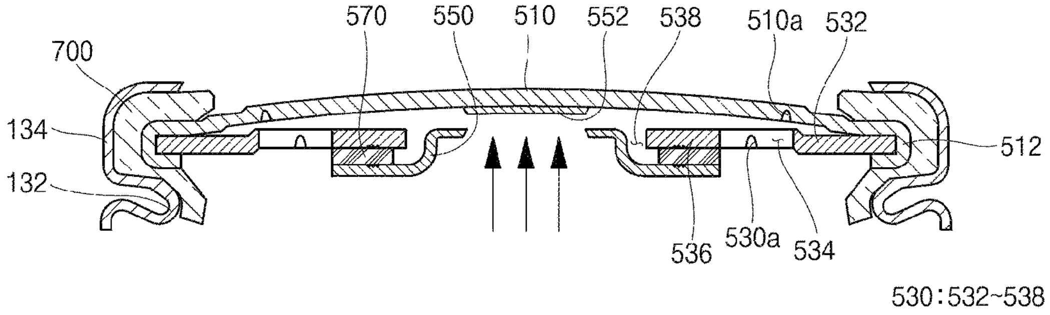
FIG. 5 is a cross-sectional view illustrating an operating state of a bent plate in the cap assembly according to FIG. 3.
Figure 6:
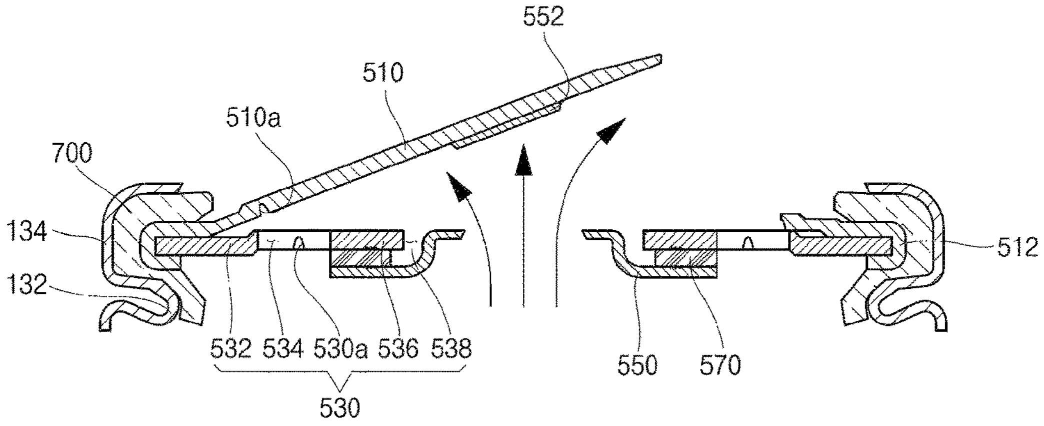
FIG. 6 is a cross-sectional view illustrating a broken state of a bent plate in the cap assembly of FIG. 5.
Figure 7:
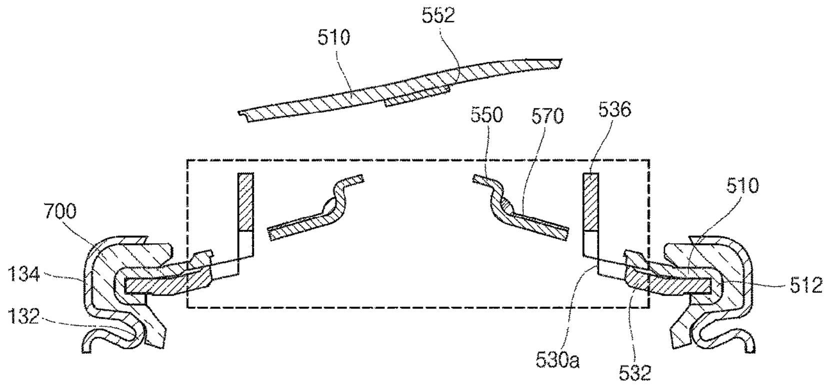
FIG. 7 is a cross-sectional view showing a state of the cap assembly when gas is discharged in the cap assembly according to FIG. 6.
Figure 8:
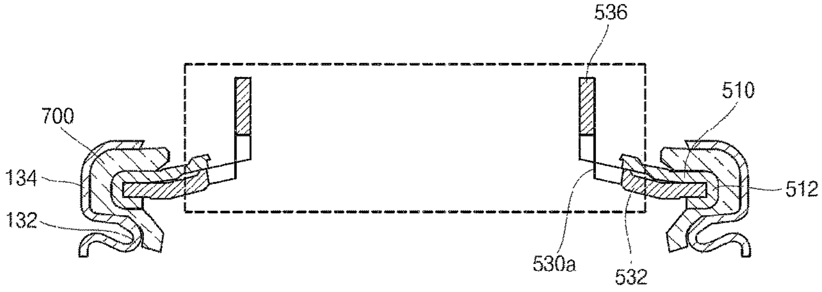
FIG. 8 is a cross-sectional view illustrating a final state of the cap assembly according to FIG. 7 after gas is discharged.

FIG. 5 is a cross-sectional view illustrating an operating state of a bent plate in the cap assembly according to FIG. 3. FIG. 6 is a cross-sectional view illustrating a broken state of a bent plate in the cap assembly of FIG. 5. FIG. 7 is a cross-sectional view showing a state of the cap assembly when gas is discharged in the cap assembly according to FIG. 6. FIG. 8 is a cross-sectional view illustrating a final state of the cap assembly according to FIG. 7 after gas is discharged.

As shown in FIG. 5, when an abnormal pressure is generated inside the cylindrical secondary battery B due to overcharging or the like, the vent plate 510 operates. While the vent plate 510 is operating, the vent plate 510 is convexly deformed upward by the gas trapped inside the secondary battery B, and thus the connection part 552 of the cap down 550 is separated, on the basis of the notch 550*a*.

When the internal gas pressure gradually increases and becomes greater than the predetermined rupture pressure, the notch 510*a* of the vent plate 510 is ruptured and a part of the vent plate 510 moves upward, as shown in FIG. 6 (Even if the notch is ruptured, the bending part remains connected to the support plate).

When the gas is instantaneously discharged as the gas discharge passage is opened by the rupture of the vent plate 510, the second support part 536 of the support plate 530 may be inverted upward by the strong gas pressure, on the basis of the notch 530*a*, as shown in FIG. 7. Since the notch 530*a* is a relatively weak part compared to other parts, deformation occurs in this part. As shown in FIG. 7, since the second support part 536 pushes the vent plate 510 upward while being pushed upward, the vent plate 510 is completely ruptured and may be separated from the cap assembly 500. The notch 510*a* of the vent plate 510 is preferably disposed outwardly rather than the notch 530*a* of the support plate 530 so as to allow the vent plate 510 to be easily separated by the second support part 536. That is, the reason of the foregoing is that the notch 530*a* of the support plate 530 is easily inverted and deformed in an upward direction as the notch 530*a* moves away from the bending part 512. When the vent plate 510 is separated, a portion of the inward direction of the vent plate 510, on the basis of the notch 510*a*, is removed, and a portion of the outward direction of the vent plate 510, on the basis of the notch 510*a*, and the bending part 512 remain connected to the support plate 530. At the same time, the cap down 550 is also pushed upward by the strong gas pressure, and the insulating member 570 is also damaged and may be separated from the support plate 530 (The insulating member is melted or damaged by the strong gas pressure and high temperature.). As the vent plate 510 and the cap down 550 are separated from the cap assembly 500, the cross-sectional area through which gas can be discharged increases, so that the gas can be discharged more quickly.

As the gas is discharged, the vent plate 510 and the cap down 550 are separated from the cap assembly 500 and removed, and the support plate 530 remains in a deformed state, and thus, the cap assembly 500 finally has a shape as shown in FIG. 8.

In the above-described embodiment, an example in which the support plate 530 is composed of the first support part 532 and the second support part 536, and, when gas is discharged, the second support part 536 is deformed in the upward direction for rupture and opening of the vent plate 510, has been described. Hereinafter, an embodiment in which the support plate 530 has a ring shape will be described (A detailed description of the same configuration as the above-described embodiment will be omitted.).

Figure 9:
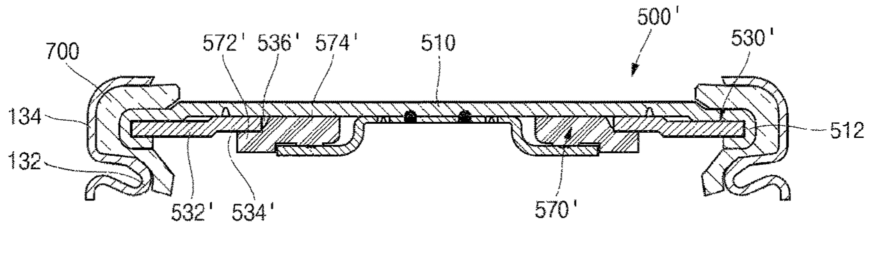
FIG. 9 is a cross-sectional view of a cap assembly of a cylindrical secondary battery according to a second embodiment of the present invention.
Figure 10:
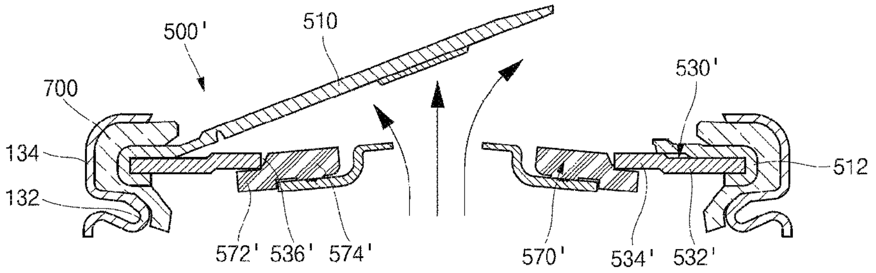
FIG. 10 is a cross-sectional view showing a broken state of a bent plate in the cap assembly of FIG. 9 is a cross-sectional view of a secondary battery according to an embodiment of the present invention.

FIG. 9 is a cross-sectional view of a cap assembly of a cylindrical secondary battery according to a second embodiment of the present invention. FIG. 10 is a cross-sectional view showing a broken state of a bent plate in the cap assembly of FIG. 9 is a cross-sectional view of a secondary battery according to an embodiment of the present invention.

As shown in FIG. 9, a support plate 530' is a ring-shaped plate material having a through hole 536' formed therein. The support plate 530' is installed in such a way that the bending part 512 of the vent plate 510 surrounds an outer edge of the support plate 530'. This portion covered by the bending part 512 is referred to as a first support part 532'. The upper surface of the support plate 530' is in contact with the lower surface of the vent plate 510, and the lower surface is in contact with the upper surface of the outer edge of the insulating member 570'. This portion is referred to as a second support part 534'. The upper surface of the second support part 534' may be formed to be higher than the upper surface of the first support part 532' corresponding to the shape of the vent plate 510.

The insulating member 570' is an approximately ring-shaped insulator having a predetermined width (a length in the left-right direction (the direction perpendicular to the central axis Y2)) on the basis of FIG. 9 and a thickness (a length in the up-down direction (the direction of the central axis Y2)) on the basis of FIG. 9. The insulating member 570' is positioned on the inner circumferential surface of the support plate 530'. That is, the insulating member 570' is positioned more inward than the support plate 530'. The insulating member 570' includes a first insulating member 572' having an upper surface in contact with the lower surface of the second support part 534', which is the inner edge of the support plate 530', and a second insulating part 574' extending inwardly from the first insulating part 572' and having an upper surface in contact with the lower surface of the vent plate 510 and a lower surface in contact with the upper edge surface of the cap down 550. The first insulating part 572' is coupled to the second support part 534' in an overlapping state. The second insulating part 574' is formed at a position corresponding to the position of the first support part 532 of the support plate 530 in the above-described first embodiment. The support plate 530' is insulated and supported by the first insulating part 572', and the vent plate 510 is insulated and supported by the second insulating part 574'. Therefore, the insulating member 570' insulates the vent plate 510 and the cap down 550 from each other and insulates the support plate 530' and the cap down 550 from each other. The first insulating part 572' is coupled to the support plate 530', and the second insulating part 574' is coupled to the vent plate 510 and the cap down 550, by welding or the like. Since a distance between the cap down 550 and the vent plate 510 is greater than a distance between the cap down 550 and the support plate 530', the thickness of the second insulating part 574' is greater than that of the first insulating part 572'.

As shown in FIG. 10, when the vent plate 510 ruptures and deforms upward during gas discharge, the insulating member 570' attached to the vent plate 510 is pulled up and the cap down 550 moves together. As the cap down 550 moves, the operating rupture scatter of the vent plate 510 increases, and the remaining portion of the vent plate 510 is easily ruptured, and thus gas can be discharged quickly. The finally remaining portion after the gas is discharged, may be the support plate 530', like in the first embodiment.

As described above, when the gas inside the cylindrical secondary battery is discharged, the support plate or cap down may be deformed due to the pressure of gas in the direction in which the gas is discharged, and the operating scatter of the vent plate increases. Therefore, after being ruptured, the vent plate is easily separated from the cap assembly, and as a result, a gas discharge passage is opened without being blocked by the remaining parts, and thus the gas can be rapidly discharged. In addition, since a cap up is omitted and the vent plate performs the functions of a safety vent and cap-up, there is an advantage in that the gas can be quickly discharged by rupture and separation of the vent plate.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the invention as defined by the following claims.

INDUSTRIAL APPLICABILITY

The present invention can be widely applied to secondary batteries and fields such as various devices or vehicles in which secondary batteries are mounted.

The invention claimed is:

1. A cylindrical secondary battery comprising:

a cylindrical can having one open end to form an opening;

an electrode assembly accommodated the cylindrical can; and a cap assembly including a vent plate on an outermost side of the cylindrical can in a first direction away from the opening, the vent plate including at least one notch, a cap down spaced apart from the vent plate in a second direction of the opening and electrically connected to the electrode assembly, a support plate between the vent plate and the cap down coupled to the vent plate, and an insulating member between the support plate and the cap down to insulate the support plate and the cap down from each other, wherein, the vent plate is configured to rupture and separate from the cap assembly based on pas inside the cylindrical can being discharged toward the opening;

wherein, the support plate includes a first support part and a second support part, wherein the second support part is configured to transition from a first state to a second state based on the gas inside the cylindrical can being discharged toward the opening, wherein in the first state the second support part is in contact with a lower surface of the vent plate and in the second state the second support part is inverted upward into an inverted position.

2. The cylindrical secondary battery of claim 1, wherein a central portion of the cap down protrudes toward the vent plate to form a connection part coupled to the vent plate, and when the vent plate is operated, the connection part is separated from the cap down.

3. The cylindrical secondary battery of claim 2, wherein the connection part has a welding part welded to the vent plate, and a first notch is formed in the vent plate to be spaced apart from the welding part in an outward direction.

4. The cylindrical secondary battery of claim 3, wherein the support plate is shaped of a circular plate and has a plurality of slits spaced from an outer edge in an inward direction and formed through along a circumferential direction and a circular through hole formed through to be spaced from the plurality of slit in an inward direction, and a plurality of second supports having an arc shape are formed between the slits and the through hole, wherein the second support part is selected from the plurality of second supports.

5. The cylindrical secondary battery of claim 4, wherein the vent plate is shaped of a circular plate and includes a bending part formed by folding an outer edge thereof, and the outer edge of the support plate is the first support part inserted into the bending part.

6. The cylindrical secondary battery of claim 5, wherein the insulating member is shaped of a ring and is disposed between the second support part and the cap down.

7. The cylindrical secondary battery of claim 5, wherein second notches are formed in a circumferential direction in regions between the plurality of slits connecting the first support part and the plurality of second supports, respectively.

8. The cylindrical secondary battery of claim 7, wherein the first notch of the vent plate is formed adjacent to the bending part, and a least one of the second notches of the support plate is formed to be spaced apart from the first notch of the vent plate in an inward direction.

9. The cylindrical secondary battery of claim 8, wherein when the gas is discharged, the support plate is reversed toward the vent plate, and the vent plate is separated from the cap assembly.

10. The cylindrical secondary battery of claim 3, wherein when the gas is discharged, the cap down is separated from the cap assembly when the vent plate is separated from the cap assembly.

* * * * *